April 24, 1956 B. S. PARMET 2,743,433

PILOT LAMP APPROACH CONTROL SYSTEM

Filed Jan. 7, 1954

INVENTOR.

Bernard S. Parmet

By: Mueller & Aichele

Attys 2,743,433

PILOT LAMP APPROACH CONTROL SYSTEM

Bernard S. Parmet, Elmwood Park, Ill., assignor to Motorola, Inc., Chicago, Ill., a corporation of Illinois Application January 7, 1954, Serial No. 402,775
6 Claims. (Cl. 340—258)

The present invention relates to pilot lamp systems for television receivers, and the like, and more particularly to an improved system whereby a pilot lamp in a television receiver is energized automatically only during periods when it is actually needed.

For the greatest enjoyment of television programs, it is usual for such programs to be viewed in a room in which the lights are dimmed, if not entirely extinguished. Because of this it is desirable that some type of pilot lamp arrangement be provided so that the receiver may be conveniently switched from time to time from one signal channel to another, or otherwise adjusted, with the various calibrations on the actuating or control knobs being illuminated when such adjustments are made. The use of such a pilot lamp system creates certain problems, however, since it is obviously undesirable for the pilot lamp to be glowing continuously while a television program is in progress as this would detract from the enjoyment of the program. The provision of a manually operated switch for energizing and de-energizing the pilot lamps results in an inconvenient system from an operational standpoint, since it is necessary for the operator to grope for the pilot lamp switch whenever the lamp is to be illuminated or extinguished.

Copending application Serial No. 395,372, filed December 1, 1953, in the name of Edward B. Passow et al., entitled "Pilot Light Switch," and assigned to the present assignee, discloses a system whereby a pilot lamp in a television receiver is energized whenever an operator grasps one of the control knobs of the receiver, and in which the pilot lamp remains energized just so long as the hand of the operator is in the vicinity of the control knob. The present invention provides an improved and simplified system of the general type disclosed in that application and which includes an improved circuit means for positively controlling the pilot lamp so that the lamp is energized only when it is desired to make certain adjustments to the receiver.

It is, accordingly, an object of the present invention to provide an improved and simplified system for controlling the energization of a pilot lamp in a television receiver, so that the lamp may be energized only when the actuating knobs of the receiver are approached by the hand of an operator.

A feature of the invention is the provision of an improved pilot lamp system for a television receiver, or the like, which includes an energizing circuit that is controlled to illuminate one or more pilot lamps whenever the hand of an operator approaches the control knobs of the receiver to adjust such knobs, and which system utilizes a periodic signal derived, for example, from the horizontal deflection system of the receiver for controlling the energizing circuit.

Another feature of the invention is the provision of such an improved pilot lamp system in which a pilot lamp is extinguished in response to a control signal derived from the periodic signal from the horizontal deflection system, and in which tuned circuit means is provided which is mistuned in response to the hand capacity of the operator to cut off the control signal and allow the lamp to be energized.

The above and other features of the invention which are believed to be new are set forth with particularity in the appended claims. The invention itself, however, together with further objects and advantages thereof, may best be understood by reference to the following description when taken in conjunction with the accompanying drawing, in which:

The invention is intended to be used in a television receiver having a manually operated control knob for effecting a desired adjustment of the receiver, and which also has a periodic signal source included in the receiver circuit. The invention includes a pilot lamp for illuminating the control knob, and an energizing circuit for the pilot lamp including switching means for controlling the energization of the lamp. A control network is coupled to the switching means, and this network responds to an applied signal for actuating the switching means to cause the lamp to be extinguished in the presence of such signal. Circuit means is interposed between the periodic signal source of the receiver and the control network, and the circuit means is responsive to the periodic signal from the source for applying a control signal to the control network. A capacitive element is disposed adjacent the control knob, and means is provided for coupling the capacitive element to the circuit means to disable the circuit means in response to capacity variations of the capacitive element so as to cut off the control signal and illuminate the pilot lamp.

Figure 1:
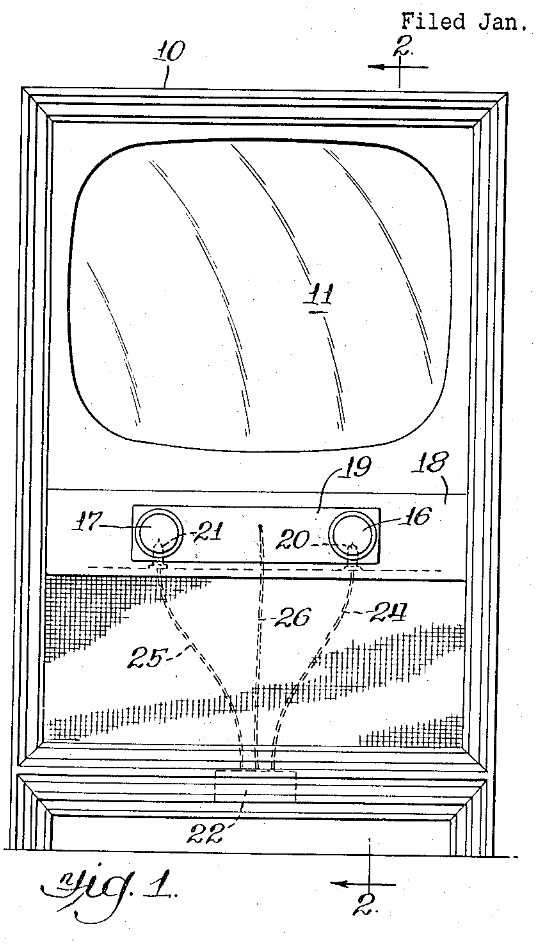
Fig. 1 is a front view of the television receiver incorporating a pilot lamp system that may be constructed in accordance with the present invention.
Figure 2:
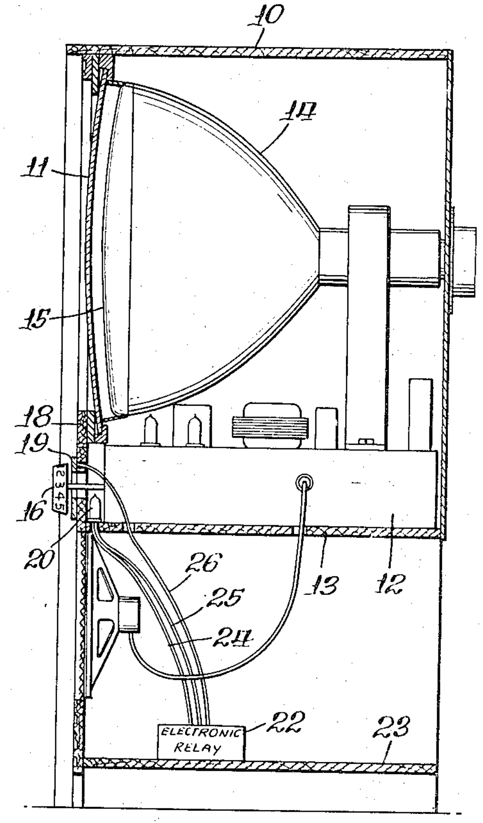
Fig. 2 is a side view of the receiver, partly in section, taken along the lines 2—2 of Fig. 1.

Referring now to the drawing, and in particular to Figs. 1 and 2 which show a television receiver including a wooden cabinet 10 and a usual viewing screen 11. A metallic grounded television chassis 12 is mounted on a wooden shelf 13 within cabinet 10, and the chassis includes a cathode-ray image-reproducing device 14 having a fluorescent screen 15 facing the viewing screen 11 of the receiver. The receiver also includes a pair of control shafts which extend from chassis 12 through respective enlarged apertures in the front wall or panel 18 of cabinet 10, and which also extend through respective enlarged apertures in a metallic escutcheon plate 19 secured to the front wall. The control shafts have respective actuating or control knobs 16, 17 mounted on their respective outer ends, and the arrangement is such that these control shafts are spaced from and out of electrical contact with the metallic escutcheon plate 19. When so desired, plate 19 need not extend beyond the knobs 16 and 17, but may be disposed between the knobs with the associated control shafts thereof extending only through the front wall 18.

Control knob 16 may, for example, constitute a station selecting dial for the receiver, and is composed of any suitable translucent material with calibrated numerals inscribed thereon corresponding to the various signal channels. Control knob 17, which also may be composed of any translucent material, may be of the dual type and serve to control volume and brightness in accordance with well-known practice.

A pair of pilot lamps 20, 21 is mounted on shelf 13 with the lamps being disposed to the rear of panel 18 respectively adjacent the apertures through which the control shafts of knobs 16, 17 extend. In this manner, the illumination of lamps 20, 21 causes the translucent control knobs 16, 17 to glow, since light from the lamps is transmitted to the knobs through the enlarged apertures in the front panel 18 and in the escutcheon plate 19.

The system also includes an electronic relay unit 22 which includes energizing and control circuits for the pilot lamps, and which unit may be mounted on a bottom shelf 23 within cabinet 10. Lamps 20, 21 are connected in series and are connected to unit 22 by way of leads 24, 25, and the metallic escutcheon plate 19 is connected to the unit by way of lead 26.

Figure 3:
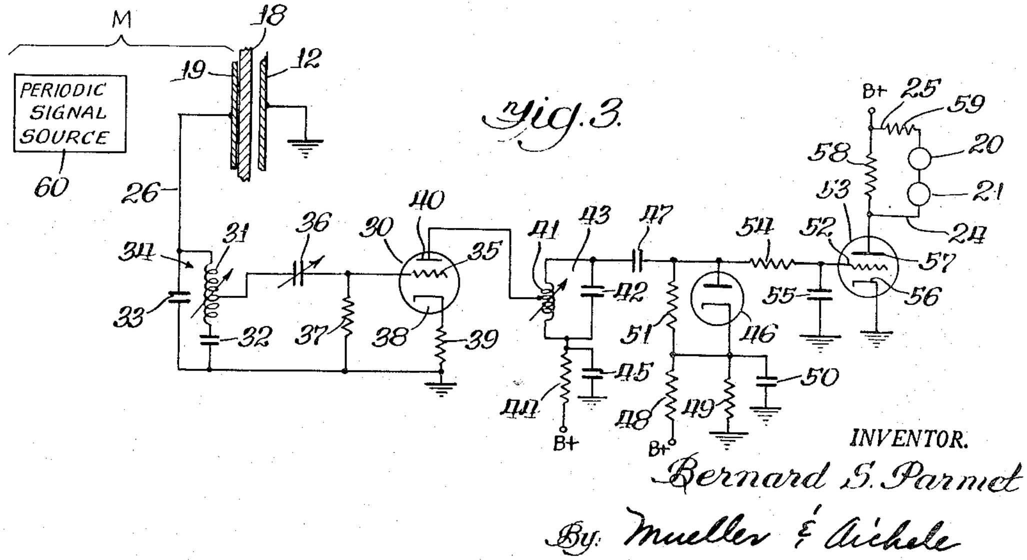
Fig. 3 shows one embodiment of the improved pilot lamp system of the present invention.

The control circuit of the present invention is shown in Fig. 3, and this circuit includes a triode electron discharge device 30 which functions as an amplifier. The input circuit of the amplifier includes a variable inductance coil 31 having one side coupled through a blocking capacitor 32 to a point of reference potential (usually chassis 12) or ground. Coil 31 and capacitor 32 are shunted by a capacitor 33 to form a resonant circuit 34, capacitor 33 usually being formed by the stray and distributed capacity in the circuit. The ungrounded side of network 34 is connected by lead 26 to escutcheon 19 which forms a capacitive element with chassis 12 through insulating panel 18. Blocking capacitor 32 serves to isolate the chassis potential from escutcheon 19 and is required, for example, in "hot" chassis receivers in which the chassis potential may either be ground or line voltage.

A tap on inductance coil 31 is coupled to the control electrode 35 of device 30 through a variable capacitor 36, and the control electrode is connected to the point of reference potential through a grid-leak resistor 37. The control electrode 35 is tapped down in this manner on coil 31 to reduce the loading effect of the input impedance of device 30 on tuned circuit 34. The cathode 38 of device 30 is connected to the point of reference potential through a degenerative resistor 39, and this resistor serves to stabilize the characteristics of device 30 in well-known manner.

The anode 40 of device 30 is connected to a tap on a variable inductance coil 41, the inductance coil being shunted by a capacitor 42 to form a second resonant circuit 43. One side of the resonant circuit 43 is connected to the positive terminal B+ of a source of unidirectional potential through a resistor 44, and this resistor is by-passed to the point of reference potential by a capacitor 45. The other side of resonant circuit 43 is coupled to the anode of a rectifying device 46 through a capacitor 47. The anode 40 is tapped down on coil 41 so that the device 30 will not damp the resonant network 43 excessively so as to impair its quality factor and decrease its selectivity. Moreover, the tapping down of the anode produces a signal voltage step-up in resonant network 43. Device 46 may be a diode, crystal or other suitable unilaterally conductive device.

The cathode of device 46 is connected to the common junction of a pair of resistors 48, 49 connected between the positive terminal B+ and the point of reference potential, resistor 49 being by-passed by a capacitor 50. The cathode of device 46 is connected to the anode thereof through a resistor 51.

The anode of device 46 is connected to the control electrode 52 of an electron discharge device 53 through a resistor 54, the control electrode being coupled to the point of reference potential through a capacitor 55 which, in conjunction with resistor 54, forms a filter. The cathode 56 of device 53 is connected to the point of reference potential, and the anode 57 of the device is connected through a resistor 58 to the positive terminal B+. Resistor 58 is shunted by the series-connected pilot lamps 20, 21 and a series resistor 59.

The periodic horizontal retrace pulses developed in the horizontal deflection system induce corresponding pulses of energy on escutcheon plate 19, and this plate is used as a source of such pulses for the control circuit of the invention. These pulses originate in the receiver in what may be termed a periodic signal source designated 60 in Fig. 2, and represented as inductively coupled to plate 19 by bracket M. As previously noted, this source may be the horizontal deflection system of the receiver. It is evident, however, that instead of from escutcheon plate 19, the pulses could be derived by coupling tuned circuit 34 to the output transformer in the horizontal deflection system or to the output stage of this deflection system.

Resonant network 34, including the normal capacitive effect of plate 19, is tuned to a frequency corresponding, for example, to the eighth harmonic of these pulses. A sine wave corresponding to this harmonic is developed across tuned circuit 34, and this sine wave is amplified by device 30 and appears across tuned circuit 43 which is also tuned to this harmonic frequency.

Variable capacitor 36 forms a capacitive potentiometer with the input capacity of device 30, and this capacitor may be adjusted so that the desired amplitude sine wave is impressed on the device. It is desirable that capacitor 36 be adjusted so that device 30 is driven just to the saturation point for maximum efficiency and sensitivity of the network, and this sensitivity can be controlled by capacitor 36.

The signal developed across resonant circuit 43 is rectified by device 46 so that a negative control potential is developed across resistor 51. This negative control potential has sufficient amplitude to overcome the positive potential at the junction of resistors 48, 49. The resultant negative control potential biases control electrode 52 of device 53 sufficiently negative to render device 53 non-conductive. When device 53 is non conductive, there is no current flow through resistor 58 and, therefore, no voltage drop across this resistor so that pilot lamps 20, 21 are extinguished. Any tendency for current to flow through the pilot lamps under this condition, so as to illuminate them, produces a voltage drop across resistor 59 which opposes this tendency.

However, when the hand of an operator approaches the actuating knobs 16, 17, the capacity of the capacitive element formed by escutcheon plate 19 and chassis 12 is varied, so that resonant network 34 is no longer tuned to the aforementioned harmonic frequency of the horizontal retrace pulses. Therefore, the amplitude of the sine wave developed across this tuned circuit is reduced. This causes the negative control signal across resistor 51 to drop so that control electrode 52 of device 53 is biased in a positive direction and device 53 becomes conductive. This produces a current flow in resistor 58 with a resulting voltage drop across this resistor sufficient to cause lamps 20, 21 to become illuminated. Resistor 54 also functions as a grid limiting resistor for device 53 so as to render the brilliance of the illumination of pilot lamps 20, 21 relatively independent of the position of the hand of the operator once the lamps have been illuminated thereby.

In this manner, plate 19 forms a periodic signal source for the control circuit by virtue of its well known characteristic of picking up the horizontal retrace pulse signal from the horizontal deflection system of the receiver. However, as previously pointed out, other portions of the television receiver may be used to constitute this source. The circuit of device 53 forms an energizing circuit for the pilot lamps, and this device constitutes a switching means included in the energization circuit. The circuit of device 46 forms a control network which responds to an applied control signal to actuate the switching means and cause the pilot lamp to be extinguished in the presence of such control signal. The circuit of device 30 forms a circuit means which responds to a periodic signal corresponding to the signal from the periodic signal source to develop a signal and apply such signal to the control network of device 46; and the capacitive element of plate 19 is coupled to the circuit means to reduce the amplitude of the signal developed by the circuit means when the capacity of this element is varied so as to actuate the switching means and illuminate the pilot lamps.

The improved control circuit of the present invention provides, therefore, an improved system for illuminating the pilot lamp whenever the hand of an operator approaches the control knobs of the television receiver, and for quickly extinguishing them when the hand is removed.

In a constructed embodiment of the invention the following constants were used, and these are listed herein merely by way of example and are not intended to limit the invention in any way:

| | |
|---|---|
| Capacitor 32 | 10,000 micromicrofarads. |
| Capacitor 36 | 50–280 micromicrofarads. |
| Resistor 37 | 1 megohm. |
| Resistor 39 | 120 ohms. |
| Capacitor 42 | 1500 micromicrofarads. |
| Resistor 44 | 10,000 ohms. |
| Capacitor 45 | 10,000 micromicrofarads. |
| Capacitor 47 | 10,000 micromicrofarads. |
| Capacitor 50 | 10,000 micromicrofarads. |
| Resistor 51 | 270,000 ohms. |
| Resistor 48 | 10,000 ohms. |
| Resistor 49 | 47,000 ohms. |
| Resistor 54 | 470,000 ohms. |
| Capacitor 55 | 10,000 micromicrofarads. |
| Resistor 58 | 56,000 ohms. |
| Resistor 59 | 100,000 ohms. |

While a particular embodiment of the invention has been shown and described, modifications may be made, and it is intended in the appended claims to cover all such modifications as fall within the true spirit and scope of the invention.

I claim:

1. In a television receiver having a manually operated control knob for effecting a desired adjustment of the receiver and having a periodic signal source, the combination of a pilot lamp for illuminating the control knob, an energizing circuit for said pilot lamp including a switching means, said switching means having a first operating condition in which said lamp is extinguished and a second operating condition in which said lamp is illuminated, a control network responsive to an applied signal above a selected amplitude for maintaining said switching means in said first operating condition in which said lamp is extinguished, resonant circuit means normally tuned to a frequency related to the frequency of the periodic signal from the source and responsive to such signal for developing a control signal above said selected amplitude and for applying said control signal to said control network, to hold said lamp extinguished, and a control element disposed adjacent the control knob and reflecting capacity variations upon the approach of the hand of an operator, said control element being connected to said circuit means to mistune said circuit means upon such approach of the hand of an operator so as to reduce the amplitude of said control signal below said selected amplitude thereby to cause said control network to actuate said switching means to its second operating condition and illuminate said pilot lamp.

2. In a television receiver having a manually operated control knob for effecting a desired adjustment of the receiver and having a periodic signal source, the combination of a pilot lamp for illuminating the control knob, an energizing circuit for said pilot lamp including switching means, said switching means having a first operating condition in which said lamp is extinguished and a second operating condition in which said lamp is illuminated, a control network responsive to an applied signal above a selected amplitude for maintaining said switching means in said first operating condition in which said lamp is extinguished, resonant circuit means normally tuned to a frequency related to the frequency of the periodic signal from the source and responsive to such signal for developing a control signal above said selected amplitude and for applying said control signal to said control network to hold said lamp extinguished, and a control element disposed adjacent the control knob and reflecting capacity variations upon the approach of the hand of an operator, said control element being connected to said circuit means and including a metallic plate subject to pick up the periodic signal from the source for application to said circuit means, and capacity variations of said capacitive element mistuning said circuit means upon such approach of the hand of an operator to reduce the amplitude of said control signal below said selected amplitude, thereby to cause said control network to actuate said switching means to its second operating condition and illuminate said pilot lamp.

3. In a television receiver having a manually operated control knob for effecting a desired adjustment of the receiver and having a periodic signal source, the combination of a pilot lamp for illuminating the control knob, an energizing circuit for said pilot lamp including an electron discharge device, said discharge device having a first biased condition in which said lamp is extinguished and a second biased condition in which said lamp is illuminated, a control network responsive to an applied signal above a selected amplitude for maintaining said discharge device in said first biased condition in which said lamp is extinguished, resonant circuit means normally tuned to a frequency related to the frequency of the periodic signal from the source and responsive to such signal for developing a control signal above said selected amplitude and for applying said control signal to said control network to hold said lamp extinguished, and a control element disposed adjacent the control knob and reflecting capacity variations upon the approach of the hand of an operator, said control element being connected to said circuit means to mistune said circuit means upon such approach of the hand of an operator so as to reduce the amplitude of said control signal below said selected amplitude thereby to cause said control network to establish said discharge device in its second biased condition and illuminate said pilot lamp.

4. In a television receiver having a manually operated control knob for effecting a desired adjustment of the receiver and having a periodic signal source, the combination of a pilot lamp for illuminating the control knob, an energizing circuit for said pilot lamp including a switching means, said switching means having a first operating condition in which said lamp is extinguished and a second operating condition in which said lamp is illuminated, a control network responsive to an applied signal above a selected amplitude for maintaining said switching means in said first operating condition in which said lamp is extinguished, resonant circuit means normally tuned to a frequency related to the frequency of the periodic signal from the source and responsive to such signal for developing a control signal above said selected amplitude and for applying said control signal to said control network to hold said lamp extinguished, said circuit means including an amplifier having input terminals connected to said resonant circuit means and including a resonant output network adapted to be tuned to a frequency related to the frequency of the periodic signal from the source, and a control element disposed adjacent the control knob and reflecting capacity variations upon the approach of the hand of an operator, said control element being connected to said resonant circuit means to mistune said resonant circuit means upon such approach of the hand of an operator and reduce the amplitude of said control signal below said selected amplitude, thereby to cause said control network to actuate said switching means to its second operating condition and illuminate said pilot lamp.

5. In a television receiver having a manually operated control knob for effecting a desired adjustment of the receiver and having a periodic signal source, the combination of an escutcheon plate inductively coupled to the source and developing a periodic signal corresponding to the periodic signal thereform, circuit means including a resonant circuit adapted to be tuned to a frequency related to the frequency of the periodic signal developed by said escutcheon plate, said resonant circuit being connected to said escutcheon plate and developing a sine wave above a selected amplitude in response to the periodic signal therefrom, said escutheon plate being disposed adjacent the control knob and exhibiting capacity variations upon the approach of an extraneous body to the control knob thereby to mistune said resonant circuit and reduce the amplitude of said sine wave below said selected amplitude, a control network coupled to said circuit means and including a rectifying device for producing a unidirectional control potential corresponding to the amplitude of said sine wave, a pilot lamp for illuminating the control knob, an energizing circuit for said pilot lamp including an electron discharge device for controlling the energization of said lamp in accordance with the bias thereof, and means for applying the control potential from said control network to said discharge device to control the bias thereof.

6. In a television receiver having a manually operated control knob for effecting a desired adjustment of the receiver and having a periodic pulse signal source, the combination of an escutcheon plate inductively coupled to the source for developing a periodic pulse signal corresponding to the periodic pulse signal therefrom, a resonant circuit including an inductance coil and a shunting capacitor and adapted to be tuned to a frequency related to the frequency of the periodic pulse signal developed by said escutcheon plate, said resonant circuit having one side connected to said escutcheon plate and having its other side connected to a point of reference potential and developing a sine wave thereacross above a selected amplitude in response to the periodic pulse signal from said escutcheon plate, said escutcheon plate being disposed adjacent the control knob and exhibiting capacity variations upon the approach of an extraneous body to the control knob thereby to mistune said resonant circuit and reduce the amplitude of said sine wave below said selected amplitude, a triode discharge device including a cathode, an anode and a control electrode, a variable capacitor coupling said control electrode to a tap on said inductance coil, a degenerative resistor connecting said cathode to said point of reference pontential, a second resonant circuit adapted to be tuned to a frequency related to the frequency of said sine wave and including an inductance coil and a shunting capacitor, means for connecting said anode to a tap on said last-named inductance coil to produce a sine wave control signal across said second resonant circuit, a control network including a rectifying device coupled to said second resonant circuit for developing a uni-directional control potential varying in accordance with amplitude variations of said control signal, a pilot lamp for illuminating the control knob, an energizing circuit for said pilot lamp including an electron discharge device for controlling the energization of said lamp in accordance with the bias thereof, and means for applying the control potential from said control network to said last named discharge device to control the bias thereof.

References Cited in the file of this patent

UNITED STATES PATENTS

| | | |
|---|---|---|
| 2,386,942 | Edelman | Oct. 16, 1945 |
| 2,525,767 | Bruns | Oct. 17, 1950 |
| 2,560,312 | Tellier | July 10, 1951 |